M. L. ADAMS.
TRACTOR ATTACHMENT.
APPLICATION FILED APR. 20, 1918.

1,310,406.

Patented July 22, 1919.
5 SHEETS—SHEET 1.

WITNESSES
J. G. Schrott

INVENTOR
Morton L. Adams
BY
ATTORNEYS

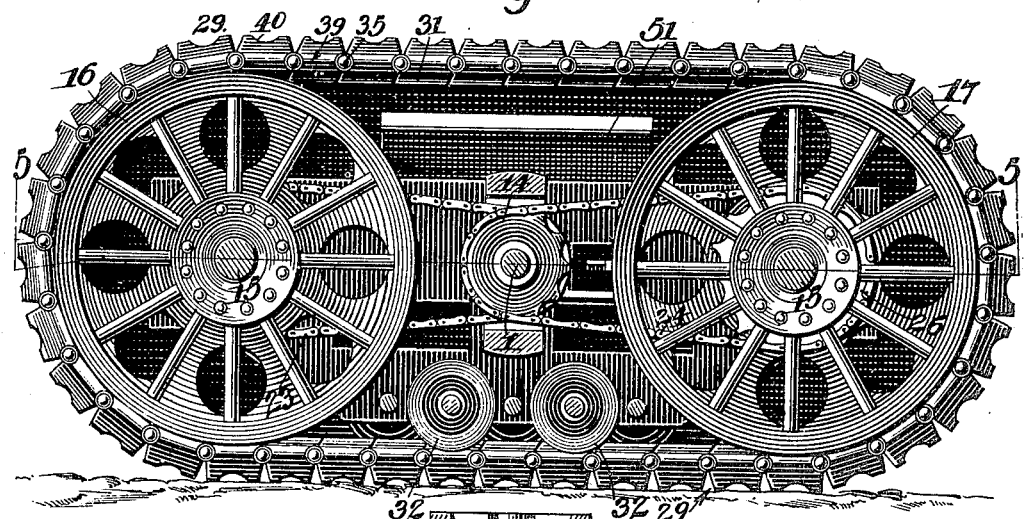
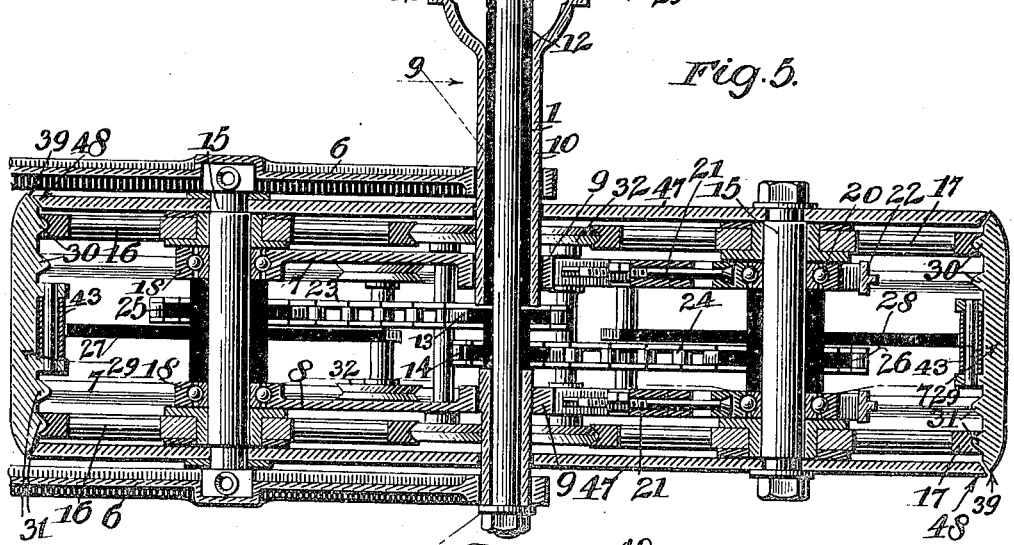
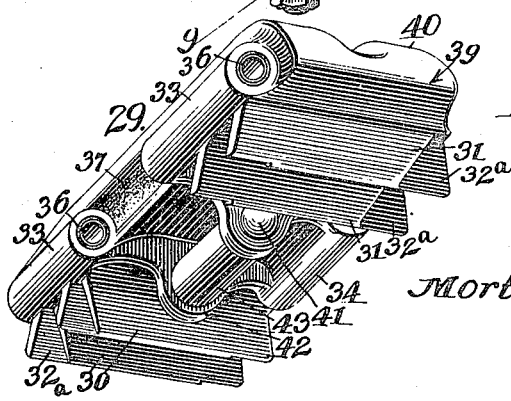

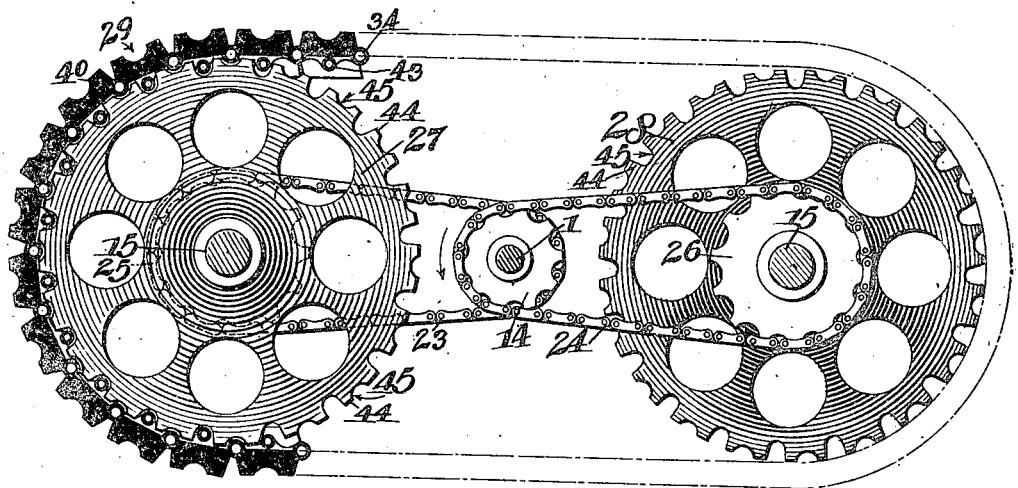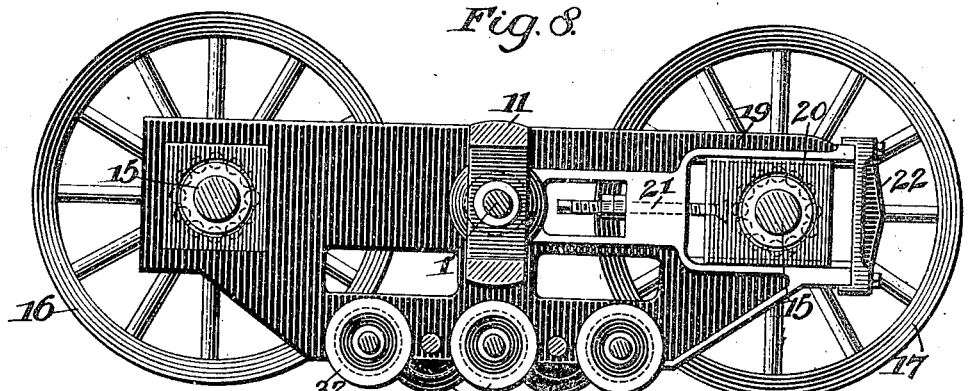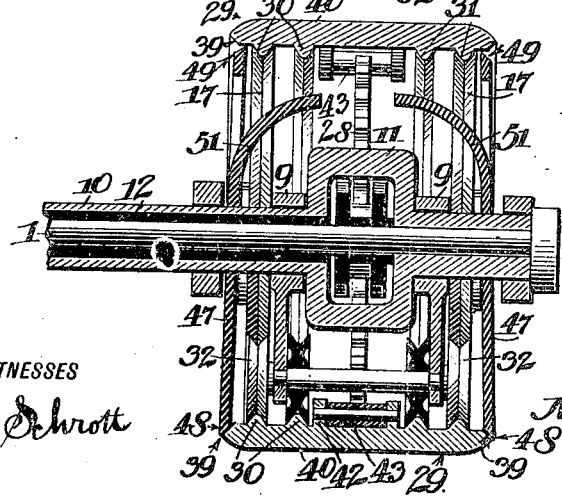

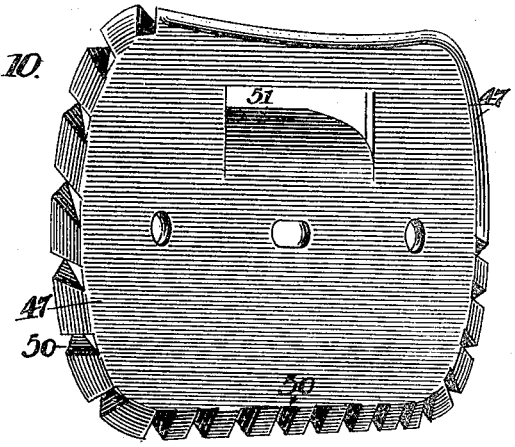
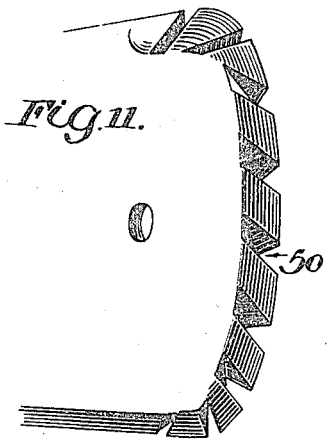
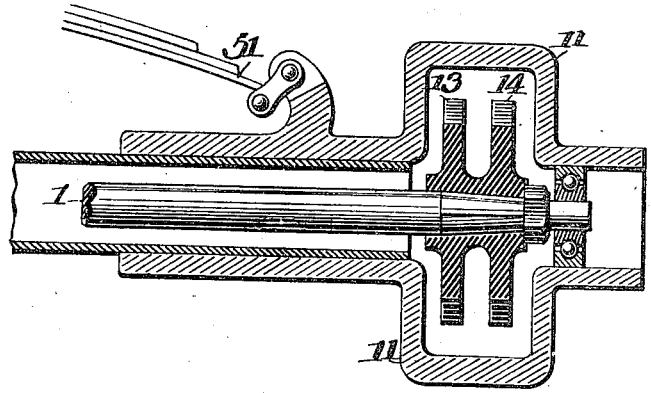
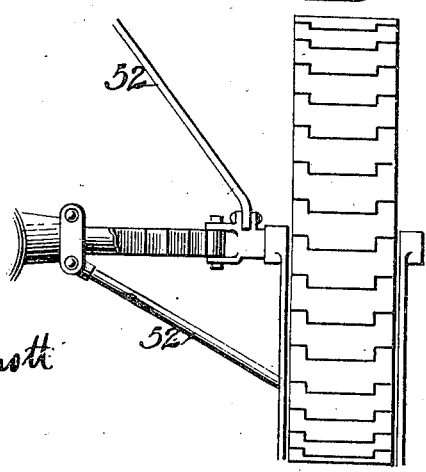

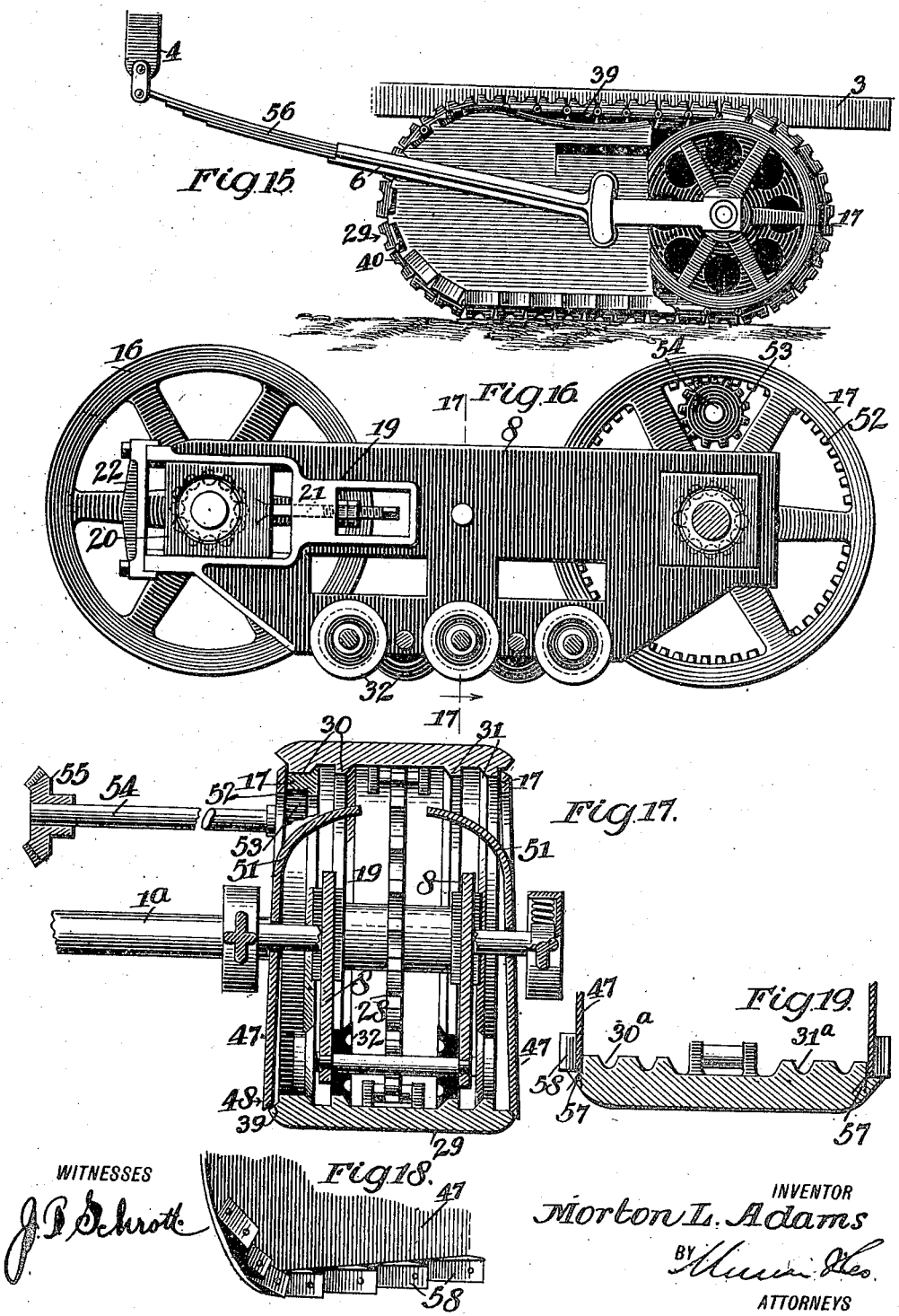

UNITED STATES PATENT OFFICE.

MORTON L. ADAMS, OF SEATTLE, WASHINGTON, ASSIGNOR TO ADAMS TRACTOR COMPANY, OF SEATTLE, WASHINGTON, A CORPORATION OF WASHINGTON.

TRACTOR ATTACHMENT.

1,310,406. Specification of Letters Patent. Patented July 22, 1919.

Application filed April 20, 1918. Serial No. 229,774.

*To all whom it may concern:*

Be it known that I, MORTON L. ADAMS, a citizen of the United States, and a resident of Seattle, in the county of King and State of Washington, have invented certain new and useful Improvements in Tractor Attachments, of which the following is a specification.

My invention relates to improvements in tractor attachments, being more particularly a tractor attachment to an automobile, and it consists in the constructions, combinations and arrangements herein described and claimed.

An object of my invention is to provide a tractor attachment for an automobile adapted to be mounted upon the rear or drive axle in place of the usual wheel, the mounting being such as to permit a certain degree of oscillation of the tractor attachment on said axle to overcome uneveness in the ground over which the automobile is moving.

Another object of the invention is to provide a tractor attachment for the purpose described, embodying a novel construction in the links whereby a plurality of continuous tracks are provided, said tracks including overlapping portions at the joints of the links to close the space and avoid noise.

Another object of the invention is to provide a case for the tractor attachment, including side plates arranged to convey adhering quantities of mud on portions of the tread to the outside.

Another object of the invention is to provide a tractor attachment including tread wheels at the opposite end for supporting the tread, and driving gears in the middle with driving connections to the respective tread wheel, the central position of said driving gears equalizing the driving strain and exerting a substantially uniform torque on all of the tread wheels.

Figure 1:
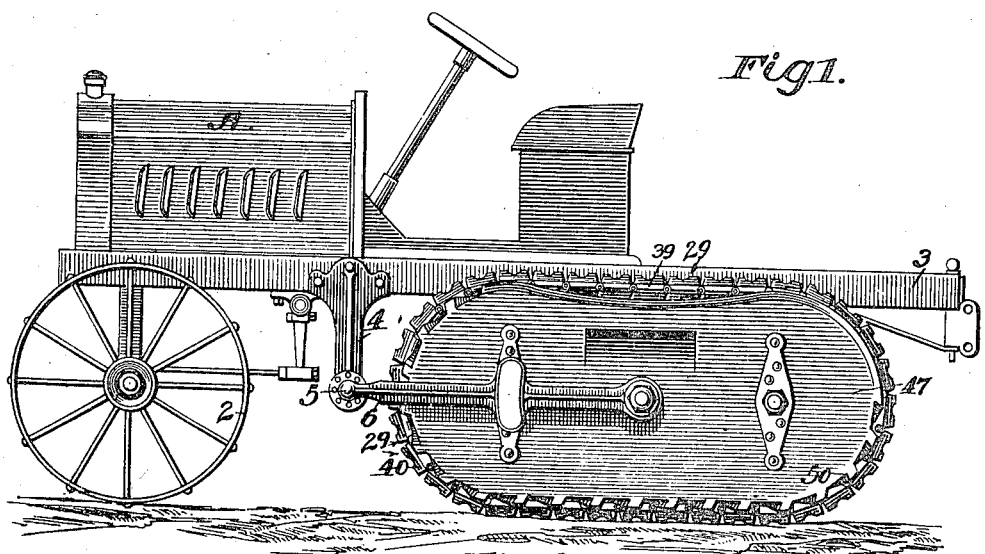
Figure 2:
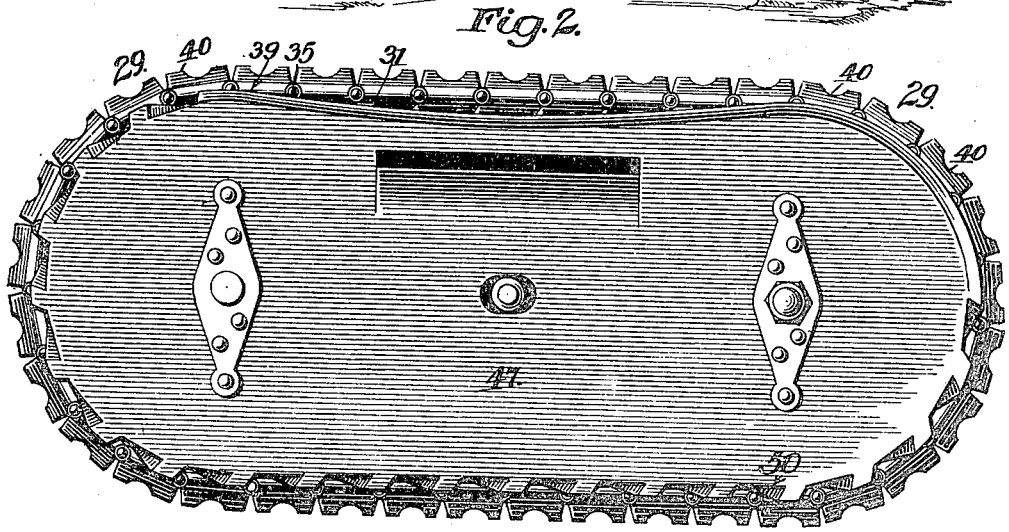
Figure 3:
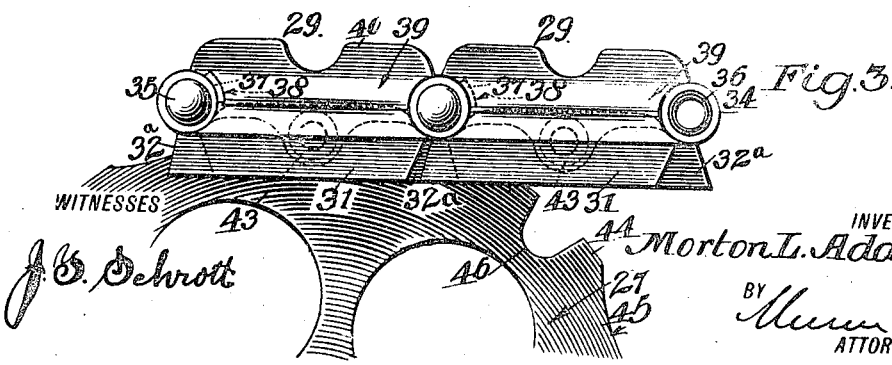

Other objects and advantages will appear in the following specification, reference being had to the accompanying drawings in which:

Figure 1 is a side elevation of a tractor automobile showing the invention applied, Fig. 2 is a side elevation of the tractor attachment the yoke being removed, Fig. 3 is an enlarged detail view showing the arrangement of the overlapping portions of the rail members, Fig. 4 is a side elevation of a portion of the tractor attachment, the front side plate being removed and parts being shown in section, Fig. 5 is a horizontal section on the line 5—5 of Fig. 4, Fig. 6 is a detail inverted perspective view of one of the tread links, Fig. 7 is a detail section on the line 7—7 of Fig. 5, Fig. 8 is a detail view illustrating the mounting of the tread wheels and track sheaves on the frame, Fig. 9 is a cross section on the line 9—9 of Fig. 5, Fig. 10 is a perspective view of one of the side casing plates, Fig. 11 is a detail perspective view showing the inside edge of one of the plates, Fig. 12 is a detail view of the lower edge of one of the plates, Fig. 13 is a sectional view showing a slight modification in mounting the tractor attachment, Fig. 14 is a detail plan view showing how the radius rod of a well known type of automobile may be attached to an adjacent one of the tractor attachment, Fig. 15 is a side elevation of a slight modification, Fig. 16 is a detail view showing the internal gear drive, Fig. 17 is a cross section on the line 17—17 of Fig. 16, Fig. 18 is a detail perspective view of a modification in the side plates, and Fig. 19 is a detail cross section of a modification in the tread links.

The subject matter of the present application is an improvement on the tractor attachment for automobiles embodied in a prior application filed March 10, 1916, Serial No. 83,312, and embodies such changes in construction as were found necessary to be made in the actual use of the tractor attachment, as will herein be fully described.

In carrying out my invention I provide a tractor attachment consisting of identically constructed units arranged to be mounted upon the extremities of the drive shaft 1 of an automobile. The automobile A in Fig. 1 is designed primarily for use as a tractor in that it is of a rugged construction and includes the metal wheels 2 at the front instead of the usual rubber tired wheels. The chassis 3 has brackets 4 on each side, which terminate in ball heads to receive the socket member 5 on the yoke 6 of each tractor attachment. In this connection it should be stated that in view of the fact that each of the units of the tractor attachment is identical in construction, the description of one will suffice for all.

Frames 7 and 8 spaced apart and located inside of the tractor attachment, are the main supports for the operating part of the attachment. The frames have hubs 9 which occupy positions on the rear axle housing 10 adjacent to a yoke or loop 11. The housing 10 is fitted over the original axle housing 12 and the drive shaft 1 in the housing 12 carries a pair of driving and equalizing sprockets 13 and 14 by means of which the tread wheels at the extremities of the tractor attachment are driven. The driving sprockets 13 and 14 are located substantially on the major axis of the attachment and the loop 11 embraces the sprockets.

Pairs of wheels 16 and 17 are mounted on axles 15 in the ends of the frames 7 and 8. The front axle 15 in the present instance has relatively fixed ball bearing mountings 18 in the frames 7 and 8 but the rear axle 15 is adjustable on the frames in order to take up any objectionable looseness in the tread of the tractor attachment. In actual practice, it is desirable to make both ends adjustable, but for the purpose of illustration in the drawings, but one end is so shown.

Screws 21 have swivel connections with the respective boxes 20 and are also provided with turning heads and jam nuts by which means the boxes are adjusted to the proper positions and the screws 21 locked in position. A cap or plate 22 closes the space between the guides 19, and the cap may be removed should it be desired to disassemble the tractor attachment to the extent of removing the rear bearing boxes and tread wheels.

The wheels 16 and 17 are driven from the driving sprockets 13 and 14 on the shaft 1, by means of chains 23 and 24 which are applied to the driving sprockets just mentioned and to driven sprockets 25 and 26 formed integrally on the hubs of tread driving or master sprockets 27 and 28. The hubs of these master sprockets are fixed on the respective axles 15 in any suitable manner, it being observed that the hubs of the master sprockets occupy positions substantially in the center of the length of the axles. The bearings 18 and 20 are located near the ends of each hub in order to afford a firm and mechanically correct support. The master sprockets 27 and 28 engage the drive pins of the tread links of the tractor attachment, and for this purpose, together with the additional purpose of conforming to the peculiar shape of the links, the master sprockets are of a peculiar formation.

Each link 29 of the tread has pairs of inward projections 30 and 31 which when alined with the inward projections of the companion links provide double rows or tracks upon which the wheels 16 and 17 ride. However, the wheels 16 and 17 ride only upon the outer tracks and to this extent the present tractor attachment is like the one in the other application previously referred to. One of the differences in the present instance comprises the extra or inner tracks which are not engaged by the tread wheels but which are engaged by a plurality of sheaves 32 as shown in Fig. 4.

The sheaves 32 bear upon the bottom strand of the tread, keeping it straight and preventing it from buckling and binding against the beveled edges of the side plates of the casing. These side plates are illustrated in Figs. 1, 2 and 10 and will be described more in detail later. The tracks 30 and 31 are V-shaped as shown in Fig. 5 and the peripheries of the tread wheels 16 and 17 and sheaves 32 are shaped correspondingly to ride upon the tracks.

Overlapping leaves 32ª on the end of the rails 30 and 31, prevent binding between the rails and avoid the making of objectionable noise during the operation of the tractor attachment. The construction of one of the links 29 is well shown in Fig. 6, which shows the link as it appears from beneath. The leaves 32ª are cut into the tracks 30 and 31 on opposite sides. It will be readily understood without further explanation, especially when consideration of Fig. 3 is taken, that the leaf portion of one track occupies and slides in the cut away portion of the other track so that, as previously stated, the leaf portions overlap and slide upon each other. This construction provides a continuous track without any break, because the overlapping portions fit together so well that the V-shaped conformation of the track is preserved throughout the length of the track in each instance.

Each link 29 has knuckles 33 and 34 which are arranged to fit together and receive the pintles 35 which connect the links together. The knuckles have bushings 36 which are made removable so that when they are worn they may be taken out and replaced. The advantage of this provision is, that the knuckles themselves will not become worn, thus avoiding looseness in the joints which would ultimately result after the tractor attachment has been in use for some time. When it is seen that there is a looseness between the joints with the present arrangement and it is suspected that worn bushings are the cause of the looseness, the pintles 35 may be taken out, the worn bushing removed and replaced with a new one, when the hinge joint will be made as tight as ever.

Leather inserts 37 are secreted in recesses or pockets 38 in the space between the knuckles 33 on each link. This insert may also be made of rubber or other suitable material, and is intended to bear against the single knuckle 34 on the other side of the link to exclude moisture and other foreign substances. The ends of the link 29 are beveled on the inner surfaces as at 39, and these beveled surfaces oppose the correspondingly beveled edges of the side plate. These beveled ends merge with the tread portions 40 of the link on top, the link in the present instance being made in one solid piece. Obviously should it be desired to replace the tread portion 40 which is solid as stated, with a rubber tread portion as is shown in the other application referred to, it may be readily done.

The drive pins 41 with which the master sprockets 27 and 28 engage, are mounted in ears 42 which project inwardly. Sleeves or rollers 43 are mounted on the drive pins to lessen the friction during the movement of the master sprockets over the drive pins. The ears 42 are formed on bridge portions which span the hollow inside portion of the link between the knuckles 33 and 34. This hollow portion of the link is partly occupied by one of the teeth of the master sprockets during the time when the engagement between the sprockets and the drive pin of the link occurs.

Attention is directed to Figs. 3 and 7, wherein the construction of the master sprockets is shown. Each sprocket has a plurality of teeth 44 which are rather long to accommodate the distance between the hinges of the links, and are made concave at 45 on top. The valleys 46 between the teeth 44 receive the rollers 43 of the drive pins 41, while the concavities 45 on top of the teeth make room for the hinge knuckles 34 during the movement of the tractor tread over the master sprockets.

Special emphasis is laid on the importance of the arrangement of the master sprockets 27 and 28 with respect to each other and with the driving or equalizing sprockets 13 and 14 on the drive shaft 1. The arrangement is best shown in Fig. 5, wherein it will be seen that the driven and master sprockets on the respective ends are formed very closely together. The master sprockets themselves are in longitudinal alinement and by this arrangement, relatively short engaging studs and sleeves on the tread links may be employed. It will be observed that the two master sprockets and driving sprockets are reversed with respect to each other, thus obtaining the arrangement just described.

Importance is also attached to the provision of the two driving chains 23 and 24. An equalization of the driving torque is obtained by the simultaneous and uniform driving of both axles 15. It was found that where but a single drive chain is employed, the strain on the various parts is considerably greater and very uneven, so that uneven wearing of such parts under strain invariably resulted. The provision of the double drive chain arrangement overcomes the objections enumerated above, and the double driving sprockets 13 and 14 become equalizing sprockets in that they transmit power uniformly to both axles of the tractor attachment.

The arrangement of the equalizing sprockets insures an even pull on the master sprockets 27, 28 and this in turn lessens the wear and strain on the tread and the tread link pins.

Alternate ones of the sheaves 32 occupy positions on opposite sides of the frames 7 and 8. While the tread wheels 16 and 17 are arranged to run only upon the outer tracks as previously stated and as shown in Fig. 5, the sheaves 32 are arranged to run on both pairs of tracks as is also partly indicated in Fig. 5. The inner sheaves 32 on the insides of the frames 7 and 8 run on the inside tracks, and the outer sheaves 32 on the outsides of the frames 7 and 8 run on the outer tracks. The bearing of the sheaves is thus well distributed over the bottom strand of the tread, and this strand is well held down to avoid the binding between the beveled edges 39 of the links on the beveled edges of the side plates of the casing.

Attention is directed to Figs. 9 and 10 which show respectively the mounting of the side plates 47 on the tractor attachment, and a perspective view of one of the plates. The side plates instead of being attached in a vertical position are mounted to diverge toward the bottom so that the sides slant upwardly and thus tend to cause accumulations of dirt to move toward the outer edges of the bottom strand of the tread. The lower edge of each side plate is beveled at 48 on the inside at the bottom and at 49 on the outside at the top. A plurality of kerfs 50 are cut into the lower beveled edge of each side plate, these kerfs 50 beginning at about the horizontal center of the side plate at the back and ending on top of the plate at the front.

In actual practice, the side plates come within the lateral edges of the tread about as shown in Fig. 9. The showing in Fig. 17 is somewhat exaggerated. The purpose of the arrangement in Fig. 9, is to prevent the side plates from riding upon an obstruction, as they might do by the momentum of the machine were they made overhanging the tread. The lifting of the tread from the ground and the consequent spinning of the tread is prevented.

The kerfs 50 are preferably cut in at an angle as shown in Fig. 10 and as more clearly shown in Fig. 12. The arrangement and purpose of the kerfs together with the inside beveled edge of the side plate in which they are cut, is to keep the dirt out from the inside of the tractor attachment. The kerfs are so formed and located with respect to the tread on the inside, that the major portion, if not all, of the dirt collected is prevented from being carried upwardly and consequently but little finds its way to the inside.

A shelf 51 formed on each side plate extends inwardly beneath both tracks on each side. Each shelf is made long enough to extend over a considerable portion of the length of the tread at the top and thus any dirt that may be carried around with the tread and tending to fall on the inside, will naturally fall upon one or the other of the shelves 51 and direct it outwardly. The provision of the shelves 51 thus takes care of any dirt that may get on the inside as just explained.

The manner of mounting the side plates 47 on the tractor attachment is one of the minor details which can be readily worked out in actual practice. It is believed sufficient to say that the side plates are supported in such a manner that they firmly hold the positions indicated in Fig. 9 so that the lower beveled edges always maintain the same relationship with respect to the beveled edges 39 of the links 29. The constructions in Figs. 13 and 14 show certain details that are employed in actual practice in mounting the tractor attachment. In Fig. 13 the driving sprockets 13 and 14 inside of the loop 11 are mounted directly on the drive shaft 1. The inwardly extending portion of the loop 11 has a lug to which one end of the rear spring 51 is attached. The radius rods 52 which are a part of a well known type of automobile, are adapted to be attached somewhat on the order illustrated.

The operation of the tractor attachment is believed to be fully understood from the foregoing description, a brief resumé of the advantages thereof is thought to be of advantage however. The tractor attachment takes the place of the drive wheel of the automobile on each side. The yoke 6 is attached to the rear axle at one end and to the ball head 5 at the other end. The projecting portion of the front axle 15 of the tractor attachment rides in a chamber formed in the yoke 6. This chamber has an arrangement of springs on the inside, which is fully brought out in my other application. The tractor attachment is pivoted in the center and this manner of mounting the attachment is most efficient for practical purposes. Instances have occurred where tractor attachments of this type were mounted on the front end, but this manner of mounting the tractor attachment is so objectionable and has so many disadvantages that it is not considered in the present instance.

The drive shaft 1 drives the driving sprockets 13 and 14 in the middle and motion is imparted uniformly to both the front and rear axles of the tractor attachment through the medium of the drive chains 23 and 24. The driving sprockets 13 and 14 compensate for any strains that might be imparted in the driving mechanism by performing the driving function uniformly. The front and rear tread wheels 16 and 17 are accordingly rotated and as the master sprockets 27 and 28 drive the tread forwardly, the rails 30 and 31 ride over the grooved wheels.

Buckling of the lower strand of the tread is prevented by the bearing of the sheaves 32 at the bottom on the pairs of rails on both sides. The number of the sheaves will be increased according to the increase in the length of the tractor attachment. The arrangement is such that the bearing of the sheaves is well distributed over the lower strand of the tread so that there is no possibility of the strand buckling or riding up on the lower beveled edge 48 of each of the side plates and thus produce binding which would result were the sheaves not distributed as they are.

The accumulation of dirt on the inside of the tractor attachment is prevented by the joint action of the shelves 51 and the inclined kerfs 50 at the bottom of the side plates. The shelves 51 dispose of any dirt that may get on the inside of the tractor attachment from the upper strand of the tread and the beveled kerfs 50 act in such a manner that none can get to the interior of the tractor attachment from the bottom.

Attention is now directed to Figs. 15 to 19 inclusive in which various further modifications are illustrated. The construction in Fig. 15 is re-designed to bring the point of attachment of the yoke 6 to the rear axle $1^a$. The inner one of the rear pair of wheels 17 is provided with an internal gear rim 52 with which a pinion 53 on a drive shaft 54 meshes.

A bevel pinion 55 on the other end of the drive shaft 54 is arranged to be driven by any suitable means from the engine of the vehicle. The arrangement just described and well illustrated in Fig. 16, is that of the well known internal gear drive and this is for the present arrangement, the best to suit the particular purpose for which the tractor attachment is intended. It will be readily observed in Fig. 15, that the tractor attachment is now supported on the axis of the rear wheels instead of in the center, and that the yoke 6 extends forwardly to the point of connection with the bracket 4, a strong leaf spring 56 being interposed to provide the necessary resilient and yielding connection.

In its other respects, the tractor attachment as here modified, is substantially the same as that formerly described. One exception, however, consists in the re-formation of the tracks 30 and 31. In Fig. 17 these tracks are shown to have one vertical wall, a flat bearing surface and an inclined wall. The sheaves 32 are correspondingly shaped to ride on the inner set of tracks, and the wheels 16 and 17 are also correspondingly shaped to ride upon the outer set of tracks, all this being clearly shown in Fig. 17.

The location of the adjustable bearing at the front of the frames 7 and 8 instead of at the rear as shown in Fig. 8, is another detail of construction which the arrangement which is now proposed makes necessary. In Fig. 19 the tracks 30 and 31 are replaced by track grooves 30ª and 31ª. The respective wheels and sheaves are to be of a corresponding shape to ride in these grooves. Instead of making the edges of the side casing plates beveled, they are shown to ride in recesses 57 at the lateral sides of the tread links. This arrangement provides a close joint between the side plates and the tread links.

In order to prevent dirt from working into the inside of the attachment, a plurality of wedges 58 are attached to the lower edge of the side plates. These wedges are triangular in shape as shown in Fig. 18 and perform the functions of plows in clearing the dirt away from the region in the vicinity of the lateral edges of the tread links. These wedges although constructed on a different order from the kerfs in Fig. 10, are for the same purpose and operate in substantially the same manner.

In conclusion, it may be stated that the invention is subject to numerous other slight modifications and changes and these may all be made without departing from the spirit of the invention or the scope of the claims.

I claim:—

1. In a tractor attachment, a movable tread, and relatively stationary means comprising side plates having means embodied therein for coöperating with the edges of the tread for agitating and working outwardly mud picked up by the tread.

2. In a tractor attachment, a movable tread, and relatively fixed side plates providing covers for the open sides of the tractor attachment, with serrated lower edges minutely spaced from the edges of the tread and coöperating with the lower strand of the tread at the edges to automatically plow out dirt accumulated by said tread and preventing it from getting to the inside.

3. In a tractor attachment, a movable tread, relatively fixed side plates providing covers for the open sides of the tractor attachment, with serrated lower edges minutely spaced from the edges of the tread and coöperating with the lower strand of the tread at the edges to automatically plow out dirt accumulated by said tread and preventing it from getting to the inside, and means located on the inside in contact with the lower strand of the tread for preventing the edges of the lower strand from buckling up and binding against said serrated edges, and maintaining said minute spacing.

4. A tractor attachment, comprising a tread having portions forming rails, tread driving sprockets directly engaging portions of the tread at both ends, and tread wheels coaxial with the tread driving sprockets at each side, running on the rails and carrying the tread at both ends thus relieving the tread driving sprockets of the weight of the tread.

5. A tractor attachment, comprising a tread having portions forming rails, tread driving sprockets directly engaging portions of the tread and exerting a driving torque on the tread at both ends, equalizing driving sprockets located centrally of the horizontal axial plane of the tread driving sprockets to exert the driving force in the horizontal plane and in equal amounts to both tread driving sprockets, driving connections between the equalizing and tread driving sprockets, and separate tread wheels running upon the rails and carrying the tread at both ends thus relieving said tread driving sprockets.

6. A tractor attachment, comprising a tread consisting of links hinged together and having rail portions forming tracks, drive pins carried by the links between the tracks, a tread driving sprocket in engagement with the drive pins at each end of the tread, and a pair of grooved tread wheels coaxially flanking the tread driving sprocket, carrying the tread at both ends to prevent the drive pins from binding on the tread driving sprocket and running on the tracks, said tracks being shaped to enter the grooved tread wheels and keep the tread from running off.

7. A tractor attachment, comprising a frame, a tread, side plates nearly abutting the tread and providing a mud shield, a pair of grooved tread wheels journaled in each end of the frame, rail portions formed on the tread providing outer and inner tracks, the outer tracks entering the grooved tread wheels and keeping the tread from running off, and a plurality of grooved sheaves supported by the frame, some running on the inside tracks and others on the outside tracks between the tread wheels, each being adapted to independently check side thrusts on the tread, all coöperating to keep the bottom of the tread straight and from rubbing against the mud shields.

8. A tractor attachment, comprising a tread, links constituting the tread, each link having a pair of spaced knuckles at one side with a recess therebetween and a single knuckle at the other side arranged to fit in the space between the pair of knuckles of another link, hinge pins joining the knuckles, and means including leather inserts secreted in the recess of each knuckle joint for wiping the single knuckle of the companion link and excluding mud from the inside of the attachment.

9. A tractor attachment, comprising a pair of supporting frames, grooved tread wheels journaled in the ends of the frames and located on the outside of the frames, a tread running over the tread wheels, rail portions formed on the tread providing a pair of parallel tracks in the plane of each frame, the outer tracks running in the grooved tread wheels and the inner tracks moving in a plane on the insides of the frames, sheaves journaled in the frames and running on the tracks of the bottom strand of the tread on the insides of the frames, and other sheaves journaled in the frames running on the tracks of the bottom strand of the tread on the outsides of the frames, the arrangement of said sheaves keeping the lower strand of the tread straight.

10. In a tractor attachment, a tread consisting of links hinged together each link having inverted V-shaped track members arranged to run in the grooved tread wheels and prevent the tread from running off, said track members having portions cut away at the ends on opposite sides to provide overlapping and interengaging leaves between the links making continuous rails, and means including leather inserts incorporated in the hinge joints of the links to exclude moisture and foreign substances.

11. A tractor attachment arranged to be balanced on one end of a drive shaft, including a tread consisting of links having beveled ends, means closing the sides of the tractor attachment including side plates having beveled edges with kerfs cut therein, said beveled edges coacting with the beveled edges of the tread links to prevent the entrance of dirt to the inside, and means engaging the lower strand of the tread to prevent it from buckling and binding between the coacting beveled edges.

12. A tractor attachment including tread wheels, a tread running over said wheels, and means closing the sides of the tractor attachment, including side plates disposed at an angle and coacting with the lower strand of the tread to prevent accumulations of dirt from working in from the outside.

13. A tractor attachment including tread wheels, a tread running over the tread wheels, rails arranged on the inside of the tread and engaged by the tread wheels, and means closing the sides of the tractor attachment including side plates spaced at angles to diverge downwardly to direct dirt toward the outside, said plates including portions extending beneath the rails on the inside at the top to catch dirt falling from the rails on the inside.

14. In a tractor attachment, the combination of a tread including tread links hinged together and having beveled ends, and side plates closing the sides of the tractor attachment, each plate having a lower inner beveled edge adjoining the beveled ends of the tread links, said beveled edge of each side plate having a plurality of kerfs cut therein at an inclination to form a plurality of plows to prevent dirt from working to the inside.

15. In a tractor attachment, the combination of a tread consisting of a plurality of tread links hinged together, having beveled ends and track portions forming continuous rails on the inside when the tread links are assembled, and side plates closing the sides of the tractor attachment and slanting outwardly toward the bottom, each plate having a lower inner beveled edge adjoining the beveled ends of the tread links at the bottom, said edge having a plurality of kerfs cut therein at an inclination to provide plows for plowing away dirt from the beveled ends, each plate including a shelf extending in beneath the rails at the top, and arranged to catch any dirt falling from the rails of the tread.

16. In a tractor attachment, a pair of compensating driving sprockets, tread driving master sprockets located in a plane longitudinally between the compensating driving sprockets, and a driven sprocket carried by each master sprocket on sides opposite to each other, in alinement with one of the compensating driving sprockets.

17. In a tractor attachment, the combination of a pair of supporting frames, an axle journaled on one end of the frames, tread wheels mounted on each end of the axle outside of the supporting frames, and a master sprocket mounted on the axle between said frames, said master sprockets including a hub fixed on the axle, and a driven sprocket on the hub.

18. In a tractor attachment, the combination of the supporting frames, an axle journaled in one end of the frames and projecting beyond the frames, side plates supported on said projecting ends and closing the sides of the tractor attachment, a tread wheel mounted on each axle between each supporting frame and side plate, and a master sprocket including a hub mounted on the axle between the supporting frames, said master sprocket having a driving sprocket fixed on the hub.

19. In a tractor attachment, the combination of a supporting frame, an axle having one end journaled in the supporting frame, a tread wheel mounted on the axle outside of said frame, a tread including a plurality of links hinged together, each link having a pair of track portions near the outer edge, said track portions forming a pair of continuous rails moving in planes at the opposite sides of said supporting frame, the outer one of the rails engaging the tread wheel, and a plurality of sheaves supported on said frame and bearing on said rails on the bottom to keep the tread down, certain of said sheaves being located on the inside of the supporting frame to engage the inner rail and certain of said sheaves being located on the outside of the supporting frame to engage the outer rail.

20. In a tractor attachment, a tread consisting of a plurality of tread links connected by hinge joints, each link having intermediate bridge portions, a drive pin fixed in place between the bridge portions, a roller on the drive pin, and a master sprocket having teeth with valleys between the teeth to engage the rollers of the drive pins, the ends of the teeth having concavities to make room for said hinge joints.

21. A tractor attachment comprising a link having grooves forming tracks for correspondingly shaped idler wheels, and recesses at the lateral edges for the reception of dirt-plowing edges of side plates, and sprocket engaging rollers supported on the link.

MORTON L. ADAMS.